8515X
2 Sheets—Sheet 1.
H. BURDEN.
MACHINE FOR HEADING SPIKES AND NAILS.
Patented Dec. 2, 1834.
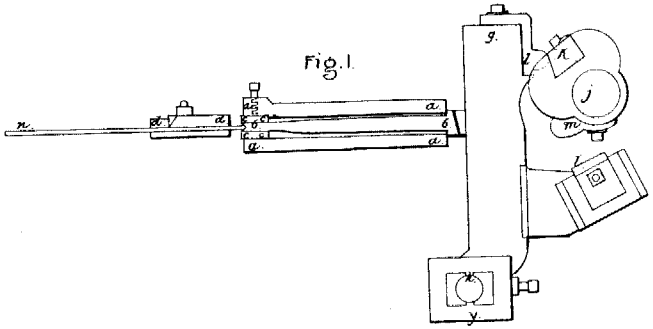
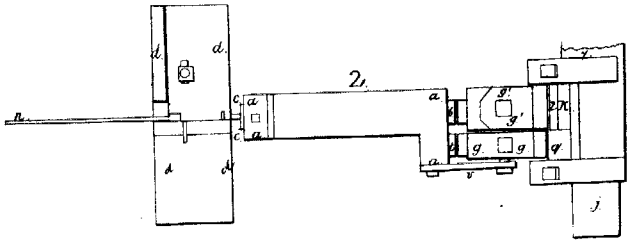
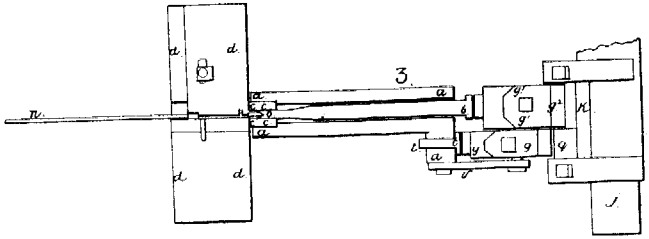
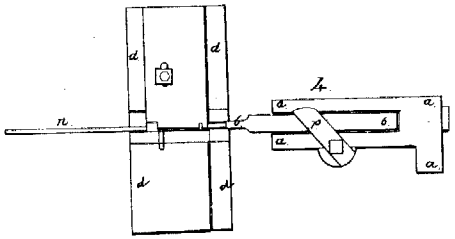
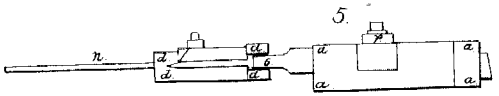
THE NORRIS PETERS CO., PHOTO-LITHO., WASHINGTON, D. C.

8515X
2 Sheets—Sheet 2.
H. BURDEN.
MACHINE FOR HEADING SPIKES AND NAILS.
Patented Dec. 2, 183
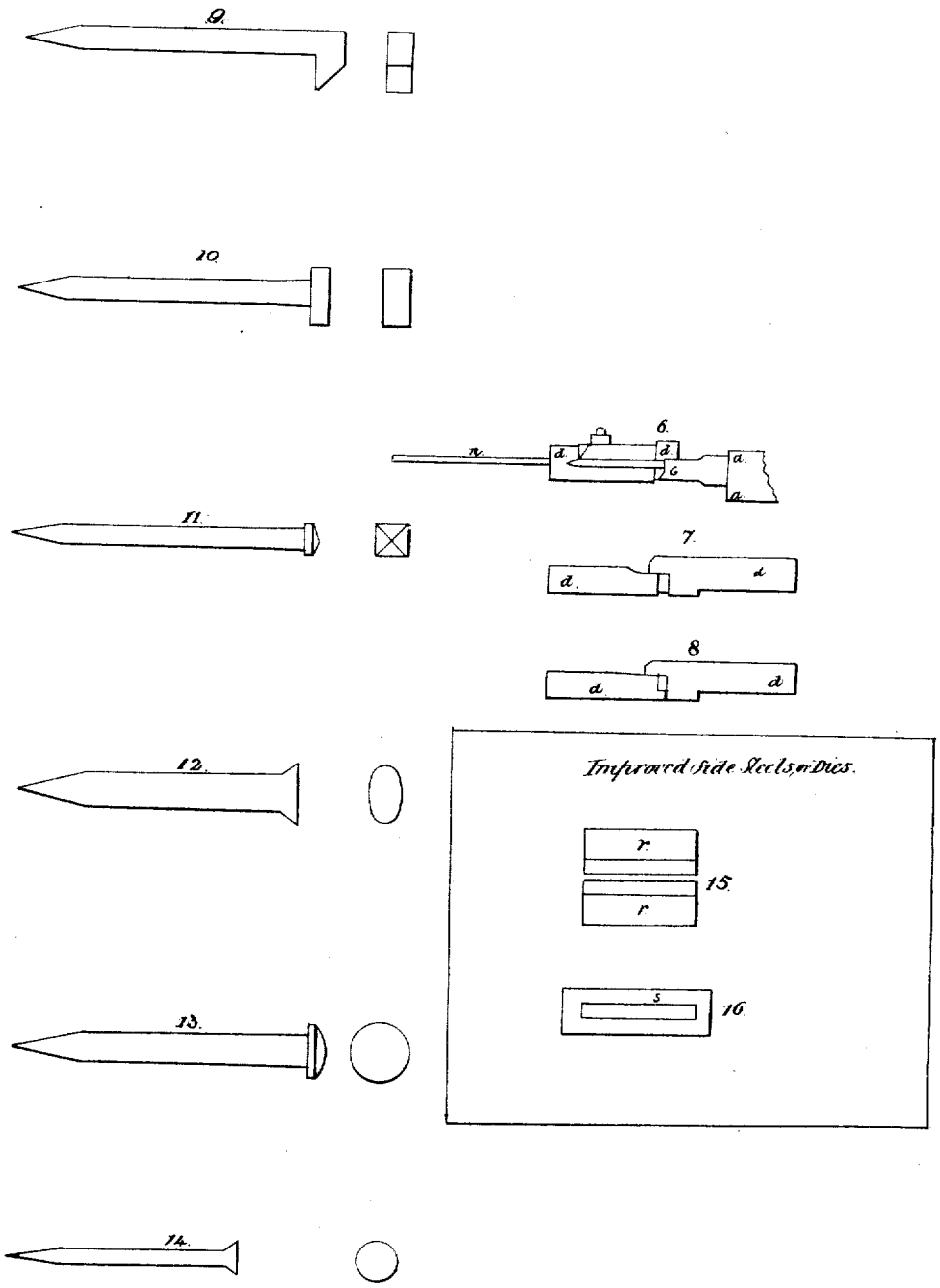
THE NORRIS PETERS CO., PHOTO-LITHO., WASHINGTON, D. C.

8515X

Dec 12.1834 89.

Henry Burden of Troy New York
Letters Patent

The Schedule referred to in these Letters Patent and making part of the same
containing a description in the words of the said Henry Burden himself
of his improvement in the machinery for manufacturing Wrought nails or spikes.

Be it known that I, Henry Burden of the City of Troy, County of
Rensselaer, and State of New York, hath made a new and useful improve-
ment in the machinery for heading nails or spikes.

The plans heretofore adopted for heading spikes or nails, have gen-
erally consisted of two, one of which was to cut a piece of iron from a rod
the length of a nail or spike intended tapering it to a point and heading
it in what is teamed a bore, by the hammer, when the spikes were of a
large size for the purposes of Ship or boat building, particular attention was
paid to making the heads perfectly square and uniform in size. which was
done by Hammering the head on all the four sides, and top alternately. while
in the bore or heading tool. until brought to the desired shape and size.

The other plan was to take hold of the piece of rod, by dies. consisting
more commonly of two pieces of steel, having half the size of the rod or shank
of nail ground or filed out of each which being compressed together like a
vice holds the piece of Rod fast, while the header by a cam presses up the
head. It will be observed by this last method, there is nothing to prevent
the head from spreading out on all sides, and very frequently, the sides of
the head will rough and split, of all shapes and sizes. In order to
remedy this difficulty. I use a block of cast iron about three inches square
and twelve inches long having a hole about one inch square through the centre
for the header to play thr [illegible] at the end of said cast iron block next to the
dies the hole is made about two inches square and about two inches in length
This increased size of hole is for the purpose of inserting a square piece of steel
called the header box, having a hole through the centre the size and shape
of head intended for the spike or nail. This piece of steel is fastened into the
cast iron block by a screw passing through the upper side of said cast iron -
block bearing against the side of steel box. The reason for having the steel

[illegible]

box separate and detached is to take it out to repair when it becomes worn
by use. It will now be observed: that were a piece of iron or rod gripped
fast by two dies. as described above (or two side steels on the sides and swedg-
es, above and below as described in my specification in the Patent office,
dated the 26th day of May 1825) preparatory to being headed and the cast
iron block pressed forward so as to bring the steel box which is inserted
in the end, in close contact with the dies. side steels & swedges or
any other substances or materials used for the purpose of griping or holding
the piece of iron or rod. while the head is being formed while in this
situation; were the header which passes thro the cast iron block: and steel
box forced forward by a cam. it would press that part of the iron or rod
which projected beyond the dies &c.&c. intended for the head so as to fill
the steel box. making the head the precise shape of the box. as soon as
the head is formed, the cast iron block. steel box and header are all drawn
back from the head of the nail by a suitable cam for that purpose.

The dies side steels and swedges, or whatever is used for the purpose
of griping the nail or spike opens. and lets the nail or spike drop.

For a further illustration of the improvement, reference must be had to
the annexed drawings and description thereof forming part of this specifica
tion. Be it also known that I Henry Burden as aforesaid hath
invented a further improvement in the machine for making wrought
nails or spikes as patented to him the twenty sixth day of May 1825.
which is described as follows. What I then termed side steels, was two
pieces of steel. each about three inches wide, one inch thick and the length
of the nail intended placed paralel to each other and fastened by means
of screw bolts in the moving frame. between these side steels the rod or
piece of iron intended for the nail or spike; was confined. while it was
headed and drawn to a point by the swedges one of which was fastened
in a roller under and the other above. | The edges of these swedges being pre
cisely the thickness of the nail or spike intended; revolved between the side
steels while in the act of rolling out the nail. It is obvious that the side -
steels must press close and hard on the sides of the swedges to prevent the
iron from escaping between the side steels and swedges while drawing - or rolling the point, which continual pressure & rubbing soon chaffed or wore both the side steels and swedges so as to make their surfaces very rough, which occasioned a great deal of grinding and repairs. It occurred to me that the cause of this great wearing of the surfaces was occasioned by the parts being all of one and the same materials being all steel and that by making what I termed side steels of some other hard material, the difficulty might be obviated. I made many experiments with different metals. and found that common cast iron chilled on the edges, answered a very excellent purpose. The method of casting these side steels is as follows. I make a pattern of wood, the size intended for the side steel, then cast a piece or block of iron, having a mortise exactly the size of the edge of the side steel, and about one inch deep. The pattern is then inserted on its edge into the mortise of the cast iron block. The pattern being surrounded by common moulding sand, which after being extracted the iron is poured into the mould; one inch in depth being surrounded by cold iron chills and hardens the edge of the side steel as far up as is wanted, which being ground, is ready for use.

First. What I claim as my invention and improvement, is the method of forming the heads of the nails or spikes in a steel box as above described. I would here, also remark, that no matter whether the box be made of cast iron or other metal, whether in two or more pieces, whether formed of part of the dies &c. &c. so long as the chamber or the hole is so constructed as to admit the header to play tight and at the same time freely simelar to the piston of a pump or steam Engine.

When spikes with round heads are wanted the box and headers resembles very much the steam Engine piston & cylinder without the covers.

Secondly – I claim as my invention, the use of cast iron side steels chilled on their edges as described above, in lieu of their being made of steel, as described in my specification now in the Patent Office, dated the 26th day of May 1825. I would also here remark that my claim extends to what is commonly termed cast iron, no matter how it is hardened; although I prefer chilling or hardening it in a cast iron block.

Witnesses { P. Hood
(1825 [illegible]) { John B Watson

Henry Burden [illegible]

(Patented 2 December 1834.)